US007121428B2

(12) United States Patent

Hiramoto

(10) Patent No.: US 7,121,428 B2
(45) Date of Patent: Oct. 17, 2006

(54) SUPPLY APPARATUS FOR SPOUTS AND BAGS WITH SPOUTS

(75) Inventor: Shinichi Hiramoto, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 27 days.

(21) Appl. No.: 10/920,605

(22) Filed: Aug. 18, 2004

(65) Prior Publication Data

US 2005/0067430 A1 Mar. 31, 2005

(30) Foreign Application Priority Data

Aug. 19, 2003 (JP) ............................ 2003-295472

(51) Int. Cl.
*B23Q 7/04* (2006.01)
*B65G 59/00* (2006.01)
*B65H 3/00* (2006.01)
*G07F 11/16* (2006.01)

(52) U.S. Cl. ...................... 221/210; 221/236; 221/239; 53/133.2

(58) Field of Classification Search ............. 198/470.1, 198/473.1, 476.1, 478.1, 474.1; 221/239, 221/210, 236; 53/133.2, 133.1, 284.7; 414/226.02, 414/739, 226.05, 331.18, 222.12; 493/213, 493/927, 929
See application file for complete search history.

(56) References Cited

U.S. PATENT DOCUMENTS 1,691,277 A * 11/1928 Furber ........................ 12/18.3
2,462,957 A * 3/1949 Gunn .......................... 452/48
4,084,684 A * 4/1978 Skinner, II ............... 198/464.2
4,408,686 A * 10/1983 Taverna ...................... 198/433
4,411,576 A * 10/1983 Smith et al. ........... 414/224.01
5,819,905 A * 10/1998 Lagoutte et al. ......... 198/465.1
6,079,541 A * 6/2000 Bercelli et al. ........ 198/377.03
6,328,152 B1 * 12/2001 Focke et al. ............. 198/468.1
6,435,336 B1 * 8/2002 Knodler ................... 198/474.1
6,655,015 B1 * 12/2003 Kraenzle ..................... 29/783
6,668,517 B1 * 12/2003 Hiramoto et al. .......... 53/133.2
6,745,540 B1 * 6/2004 Hiramoto et al. .......... 53/133.2
6,751,928 B1 * 6/2004 Hiramoto et al. .......... 53/133.2
6,799,674 B1 * 10/2004 Hiramoto et al. ........ 198/478.1
6,810,636 B1 * 11/2004 Resterhouse ............... 53/133.2
6,938,753 B1 * 9/2005 Bonatti et al. ........... 198/470.1
2004/0013417 A1 * 1/2004 Matsuda et al. ............ 386/125

FOREIGN PATENT DOCUMENTS

JP 11-333950 12/1999
JP 2001-293798 10/2001
JP 2001-353793 12/2001

* cited by examiner

*Primary Examiner*—Kathy Matecki
*Assistant Examiner*—Rakesh Kumar
(74) *Attorney, Agent, or Firm*—Koda & Androlia

(57) ABSTRACT

A spout supply apparatus including a spout transfer device in which two spout holding devices 43 and 44 are respectively disposed on each end of a reciprocating swing arm 41 that makes a reciprocating swing motion in the horizontal plane through a swing angle of substantially 90 degrees about a supporting shaft 45. Upon the swing motion of the swing arm 41, the spout holding devices 43 and 44 alternatively receive a spout that is at the leading end of a row of lined spouts, at a spout receiving position T and are alternatively moved to spout transfer positions U, thus transferring the spout to the spout clamping member 3 which is at each one of the spout transfer positions U.

4 Claims, 13 Drawing Sheets

SUPPLY APPARATUS FOR SPOUTS AND BAGS WITH SPOUTS

BACKGROUND OF THE INVENTION

1. Technical Field

The present invention relates to a spout supply apparatus that supplies spouts and bags to which spouts are attached to, for instance, a spout sealing machine (that covers supplied spouts with bags and seals such spouts and bags by hot plates, etc.) and to a filling machine (that fills supplied bags to which spouts are attached with contents).

2. Description of the Related Art

Part feeders are widely used in cases where spouts are supplied to a spout sealing machine. In part feeders, spouts (see FIGS. 13A and 13B) are held from both sides thereof by rails (that fit into grooves c between flanges a and b of a spout) and conveyed while lined up in a single row in a vertical state, at least in the vicinity of the terminal end of the part feeder. In the spout S shown in FIGS. 13A and 13B, d indicates a sealing portion, and h indicates a head.

When the spout S is conveyed, by way of setting the direction of length (the left-right direction in FIG. 13A and the direction perpendicular to the drawing sheet in the case of FIG. 13B) of the flanges a and b of the spout S to face in the conveying direction of the spouts, it is possible to increase the treatment (conveying) capacity and to obtain a stable conveying state of the spouts. Accordingly, it is desirable that the spouts S be conveyed in this orientation. Similarly, in cases where bags to which spouts are attached are conveyed on rails (the places supported by the rails are the same as in the case of conveying the spouts), the direction of width of the bags W (see the imaginary lines in FIGS. 13A) is set to be parallel to the conveying direction for a better treatment (conveying) capacity and a stable conveying state of the spouts.

Furthermore, inside the spout sealing machines as well, it is desirable that the continuously or intermittently conveyed spouts be held so that the direction of length of the flanges a and b faces in the conveying direction of the spouts. For example, if the spout sealing machine is a rotary type machine, this means that the direction of length of the flanges faces in the tangential direction. In this case, the bag surfaces are oriented parallel to the conveying direction as a result, so that treatments such as the sealing of the bags, printing on the bag surfaces, etc. can easily be performed.

In Japanese Patent Application Laid-Open (Kokai) Nos. 2001-353793 and 11-333950, spouts are set, in a spout sealing machine, to be held so that the direction of length of the flanges faces in the conveying direction.

In cases where a part feeder is installed adjacent to a spout sealing machine, it is desirable that the part feeder be disposed so that the conveying direction of the part feeder and the spout conveying direction of the spout sealing machine differ by 90 degrees. The reason for this is as follows: since various types of processing devices are ordinarily installed in succession along the spout conveying direction in a spout sealing machine, spatial interference between the part feeder and such various types of processing devices can be avoided by adopting such a layout; and the space around the spout sealing machine can be effectively utilized.

In Japanese Patent Application Laid-Open (Kokai) Nos. 2001-353793 and 2001-293798, a layout is adopted so that the conveying direction of a part feeder and the spout conveying direction of a spout sealing machine differ by 90 degrees.

In order to satisfy the above-described three desirable configuration (orientation of the spouts in the part feeder, orientation of the spouts in the spout sealing machine and installation positions of the spout sealing machine and part feeder), it is necessary to alter the orientation of the spouts by 90 degrees when the spouts that are fed out from the part feeder are supplied to the spout sealing machine. In the above-described Japanese Patent Application Laid-Open (Kokai) No. 2001-353793, a transfer device is disposed between the part feeder and the spout sealing machine, and the orientation of the spouts is altered by this transfer device.

Meanwhile, there are cases in which a so-called W type (the expression "W type" is used in the sense of treating two spouts at the same time) spout sealing machine is required in order to increase the treatment capacity of the spout sealing machine. Even though the treatment capacity of the spout sealing machine is doubled in the W type machine, the part feeder generally has an even greater capacity. Accordingly, by branching only the terminal end of the part feeder into two rows, it is possible to achieve the simultaneous supply of two spouts to two adjacent spout clamping portions of a W type spout sealing machine by means of a single part feeder. In the above-described Japanese Patent Application Laid-Open (Kokai) No. 2001-293798, though there are differences between spouts and ports, two ports are simultaneously supplied to a spout sealing machine by causing the terminal end part of a part feeder to branch into two rows.

However, in cases where the orientation of the spouts is altered by 90 degrees, it is necessary to install transfer devices that can alter the orientation of the spouts by 90 degrees at the respective terminal ends of the two rows of spouts. As a result, an increase in cost and an increase in the complexity and size of the spout sealing machine are unavoidable.

BRIEF SUMMARY OF THE INVENTION

It is, therefore, an object of the present invention to make it possible to supply spouts and bags to which spouts are attached (such bags called "bag(s) with (spout(s)) below) to two adjacent spout clamping members of a W type spout sealing machine or filling machine without causing the row of spouts or bags with spouts that are conveyed in the form of a row to branch into two rows by means of a single transfer device.

It is another object of the present invention to prevent an increase in the cost of the spout sealing machine and an increase in the complexity and size of the structure of the spout sealing machine by realizing the transfer device as a simple structure.

The above object is accomplished by a unique structure of the present invention for a spout supply apparatus that includes a spout conveying and positioning device, which conveys spouts lined up in a single row and successively positions a spout (a leading or first spout) in a spout receiving position, and a spout transfer device, which successively receives the spout (a leading or first spout) that is in the spout receiving position, conveys the spout toward spout transfer positions while changing orientation of the spout by approximately 90 degrees, and transfers the spout to spout clamping members that are disposed at the spout transfer positions; and in the present invention, the spout transfer device is comprised of two sets of spout holding members that have a common swing center and swing in a reciprocating swing motion in a horizontal plane through a swing angle of approximately 90 degrees, the two sets of spout holding members have respective holding centers which are set to be equidistant from the swing center, the two sets of spout holding members are provided at an angle of approximately 90 degrees apart from each other, each one of the spout transfer positions is disposed on either side of the swing center, and the spout receiving position and spout transfer positions are located at either end of a circular arc that is drawn, when the two sets of spout holding members swing, by each one of the holding centers of the spout holding members.

In the following description, the terms "spout receiving position" and "spout transfer positions" are used in regards to the actions of the spout transfer device.

In the structure above, the two sets of spout holding members are comprised of a first set of spout holding members and a second set of spout holding members; and when the two sets of spout holding members are at one end of the swing motion, the first set of spout holding members holds a spout in the spout receiving position, while the second set of spout holding members transfers a spout in one of the spout transfer positions to a spout clamping member that is waiting in this spout transfer position, and when the two sets of spout holding members are at another end of the swing motion, the second set of spout holding members holds a spout in the spout receiving position, while the first set of spout holding members transfers a spout in another one of the spout transfer positions to a spout clamping member that is waiting in this spout transfer position.

In this spout transfer device, in a single reciprocating swing motion of the two sets of spout holding members, two spouts are successively received in the spout receiving position and transferred to respective spout clamping members in the respective spout transfer positions. Accordingly, the spout transfer capability is extremely high. In addition, the spout holding members receive spouts, and these spout holding members swing while drawing an approximately 90-degree circular arc up to the point where the spouts are transferred to the spout clamping members. Thus, the spout transfer device alters the orientation of the spouts by approximately 90 degrees while transferring the spouts.

In the above-described spout transfer device, the spout holding members can be, for instance, chucks that respectively open and close and hold spouts when closed. The two sets of spout holding members are provided on a reciprocating swing arm that make a reciprocating swing motion in the horizontal plane through a swing angle of approximately 90 degrees. In this case, the swing center of the reciprocating swing arm naturally coincides with the swing centers of the two or a pair of spout holding members.

In the above-described spout conveying and positioning device, a pair of clamping arms that hold the leading spout positioned in the spout receiving position are disposed as a means of holding the spout in the spout receiving position. These clamping arms respectively swing in the horizontal plane and are resiliently driven inward in a direction that is substantially perpendicular to the row of spouts, so that the leading spout in the row of spouts is held from both sides in the spout receiving position by tip end clamping portions of the clamping arms. When the clamping arms swing toward the spout transfer positions from the spout receiving position, the clamping arms are pressed against the spouts held by the spout holding members and swing by a proportional amount against the resilient force. The spouts are thus given to the spout holding members from the spout receiving position.

The spout supply apparatus of the present invention includes push-in members that respectively swing in the horizontal plane in the vicinity of the two spout transfer positions. The spout clamping members are formed to have clamping grooves that hold the spouts, so that the push-in members push the spouts that are held in the vicinity of the entrances of the clamping grooves to the deep inside of the spout transfer positions.

The spout clamping members can be spout clamping members of a spout sealing machine. In addition, the spout supply apparatus can be applied not only to the supply of spouts alone in a spout sealing machine, and it is applicable in a similar manner to the supply of bags that are attached with spouts in a filling machine. Accordingly, the above-described spout clamping members can also be spout clamping members that are provided in a filling machine. In any case, the term "spout" used with reference to the present invention refers both to a spout alone and to the spout in a bag that is attached with a spout.

In the present invention, upon conveying spouts (and/or bags having spouts) which are lined up in a single row to a W type spout sealing machine or to a filling machine from a spout conveying and positioning device that successively positions the leading spouts in a spout receiving position, such spouts (and/or bags with spouts) are supplied at a high transfer capability to two adjacent spout clamping members of the W type spout sealing machine or of the filling machine by means of a single transfer device without causing the row of spouts (and/or bags with spouts), which are conveyed in a row arrangement, to branch into two rows. The spouts (and/or bags with spouts) can be supplied to the spout sealing machine or to the filling machine while, at the same time, altering the orientation of the spouts by approximately 90 degrees. Furthermore, the above operations are executed by means of a spout transfer device that has a simple structure.

The spout supply apparatus of the present invention can be applied not only to a W type spout sealing machine or to a filling machine, but also to a multi-unit type spout sealing machine or to a filling machine with three units (a machine in which three spouts or bags with spouts are treated at the same time) or a multi-unit type spout sealing machine or a filling machine with an even greater number of units. For example, in a three unit type machine, it is sufficient to provide one spout supply apparatus of the present invention and one conventional type spout supply apparatus that supplies a single spout; and in a four unit type machine, it is sufficient to provide two spout supply apparatuses of the present invention.

DETAILED DESCRIPTION OF THE INVENTION

The spout supply apparatus of the present invention will be described below in detail with reference to FIGS. 1 through 12. In this spout supply apparatus, the reference to the directions such as the "forward" direction and "rearward" direction, etc., is based on the conveying direction of the spouts.

Figure 1:
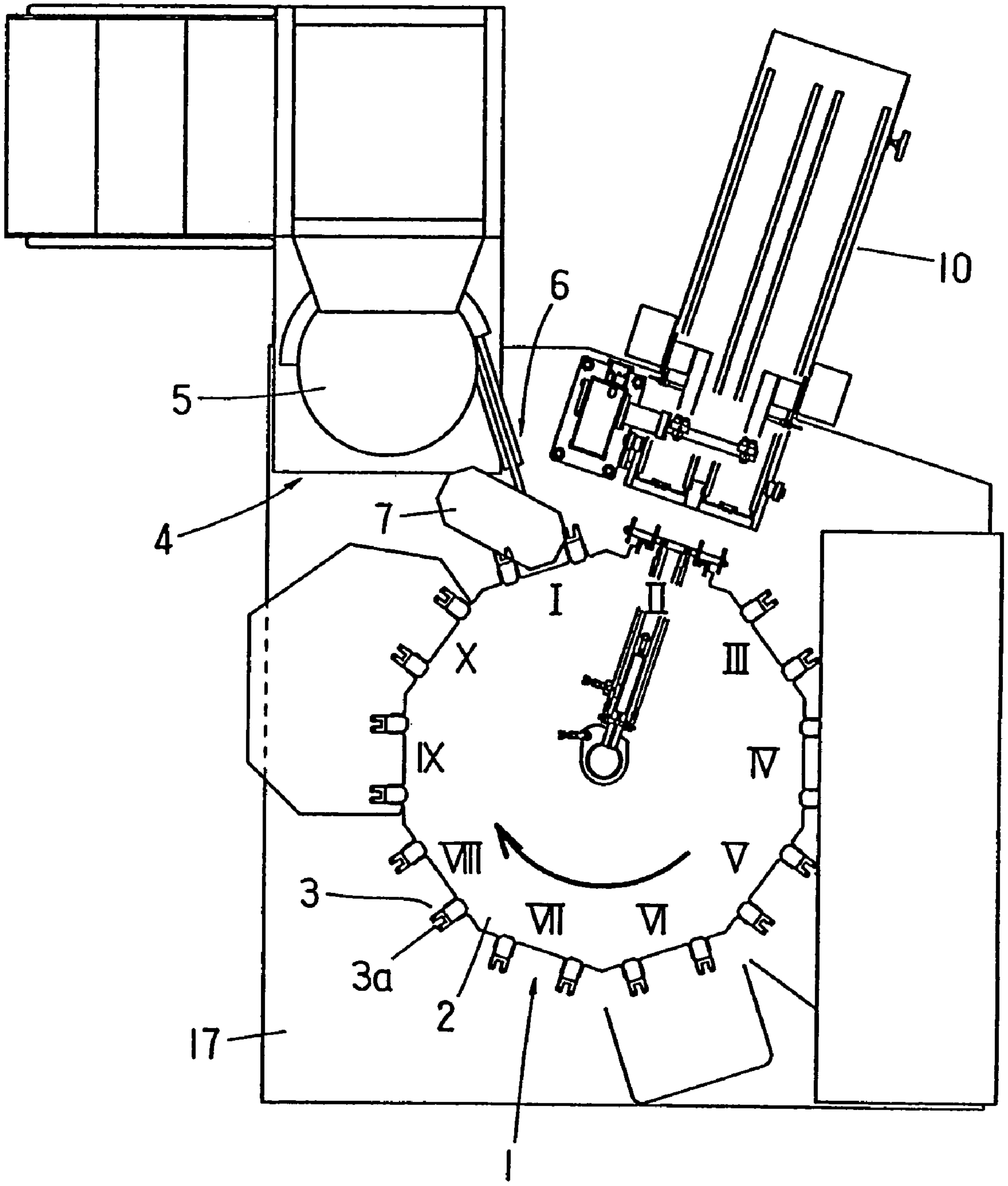
FIG. 1 is a schematic top view of the overall spout sealing machine that includes the spout supply apparatus of the present invention.
Figure 13A:
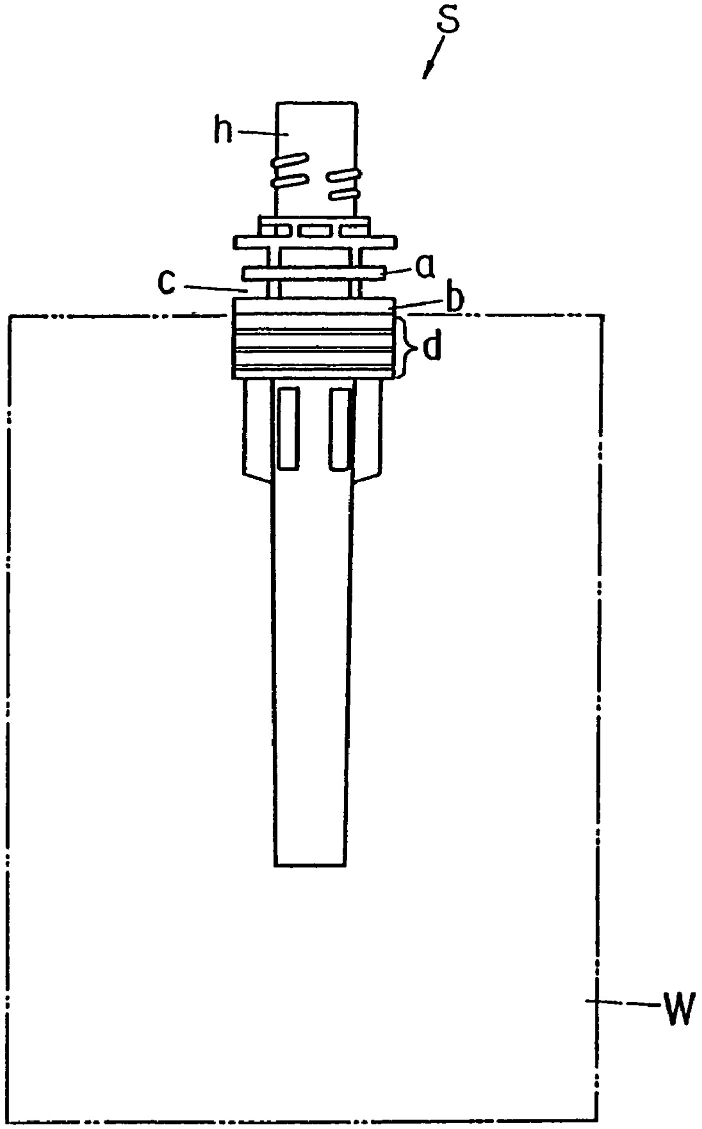
FIG. 13A is a front view of a spout with a bag attached thereto shown by dashed lines.
Figure 13B:
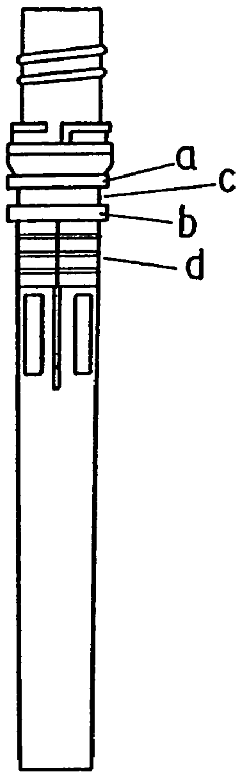
FIG. 13B is a side view thereof.

FIG. 1 shows a W type spout sealing machine 1 viewed from above and peripheral devices that operate with this spout sealing machine 1. The spout sealing machine 1 puts a bag on a spout and seals the bag and the sealing portion d of the spout S (see FIGS. 13A and 13B). The bag is sealed along the entire width of each bag opening.

The spout sealing machine 1 includes a rotational table 2. The rotational table 2 intermittently rotates and is provided with a plurality of spout clamping members 3 (20 spout clamping members 3 in the shown embodiment) that are installed on the circumference of the table 2. The table 2 stops ten times during one revolution that is shown by curved arrow; and each time the table 2 stops, the respective steps of: spout supply (I), bag supply, bag mouth opening and covering of the spouts with the bags (II), bag positioning and temporary sealing (III), first sealing (IV), second sealing (V), cooling of the sealed portions (VI), printing of the date (VII), inspection of an image of the sealed portions of the spouts and inspection of the date (VIII), removal of the product (IX) and discharge of defective bags (X) are successively performed in the respective stopping positions I through X.

The spout clamping members 3 provided on the table 2 are formed with clamping grooves 3*a*. The clamping grooves 3*a* open in the outward radial direction of the table 2 (two spout clamping members 3 next to each other make one set, and the opening direction of the clamping grooves 3*a* is the same for the same set of clamping members). Portions of the clamping grooves 3*a* located near the entrances of these grooves are spread outward.

The intermittently rotating type spout sealing machine as described above is widely known, except that the shown spout sealing machine is formed as a W type machine.

On the outside of the stopping position I of the spout sealing machine 1, a spout supply apparatus 4 is provided, and spouts are respectively supplied to two spout clamping members 3 that stop in this stopping position I. The spout supply apparatus 4 comprises a part feeder 5, a spout conveying and positioning device 6 which is installed, as a part of the part feeder 5, on the terminal end portion of the part feeder 5, and a spout transfer device 7 which is disposed between the spout conveying and positioning device 6 and the spout sealing machine 1.

A known conveyor type magazine device 10 that supplies simultaneously two bags to the spout sealing machine 1 is disposed on the outside of the stopping position II.

As seen from FIGS. 2 through 6, the spout conveying and positioning device 6 includes spout supply rails 8, which have (on the inner side) a space through which the head h of the spout S pass, and sterile pressurized air passages 9, which are integrally formed on both sides of the rails 8. Pressurized sterile air from the sterile pressurized air passages 9 is blown out into the space between the spout supply rails 8 via blow-out holes 11 that are formed in the spout supply rails 8, so that the spouts S are driven in the forward (upward in FIG. 2) direction. Supporting portions 12 and 13 that protrude to face each other are formed on the insides of the spout supply rails 8. These supporting portions 12 and 13 fit into the groove c of the spout S and thus support the spouts S being conveyed in the forward direction.

Figure 2:
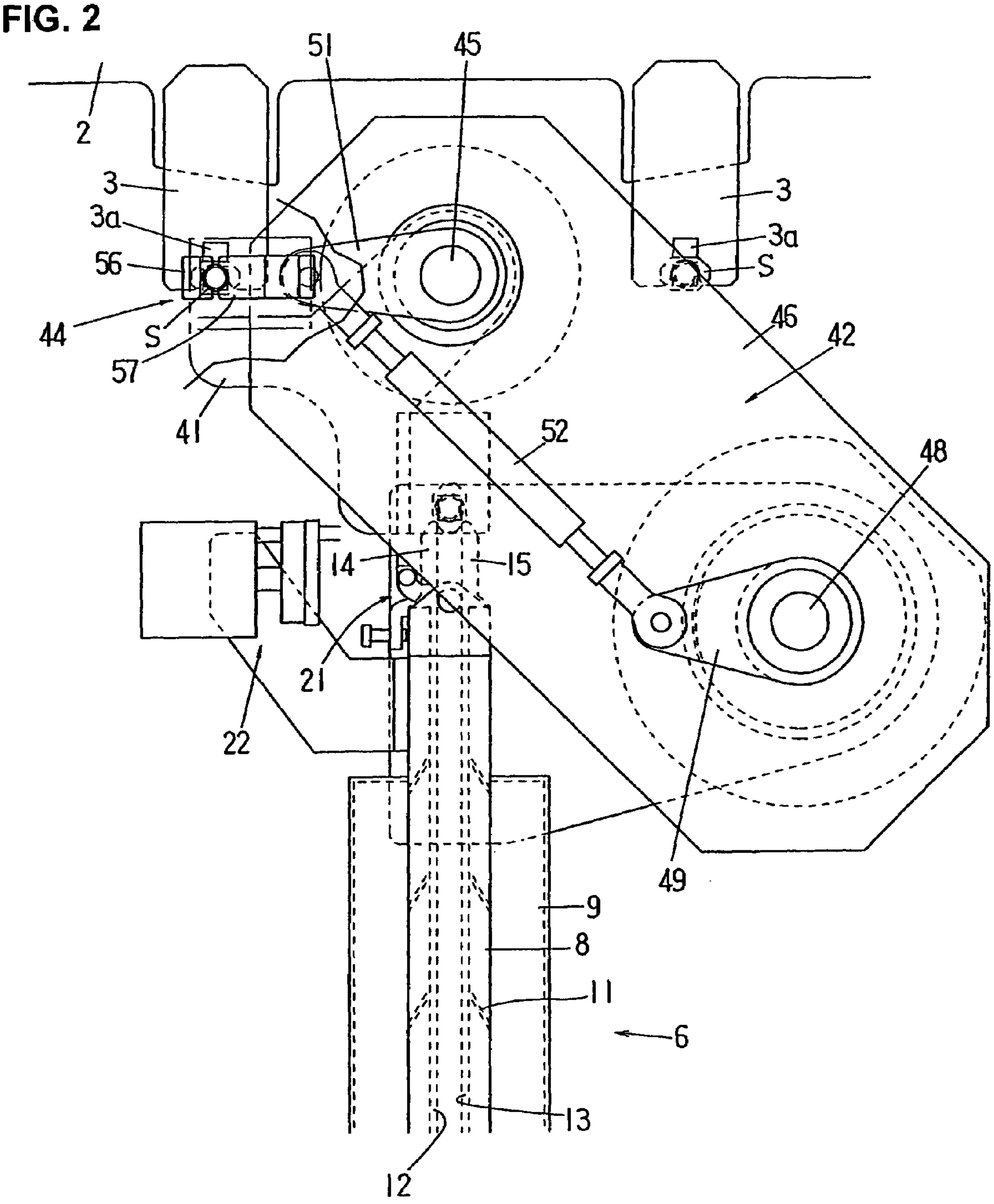
FIG. 2 is a top view of the spout supply apparatus of the present invention.
Figure 3:
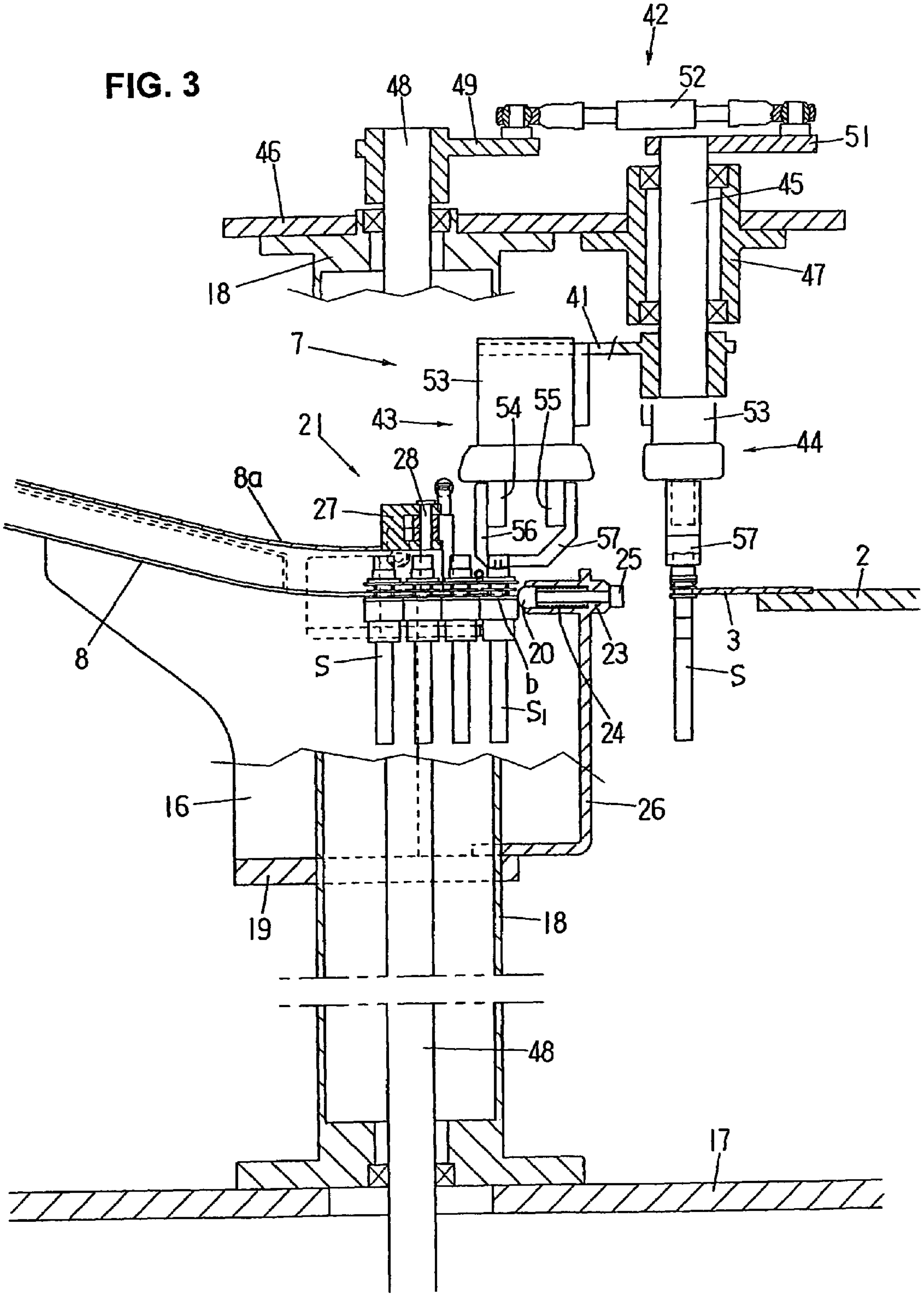
FIG. 3 is a side view, in cross section, of the spout supply apparatus of the present invention.
Figure 4:
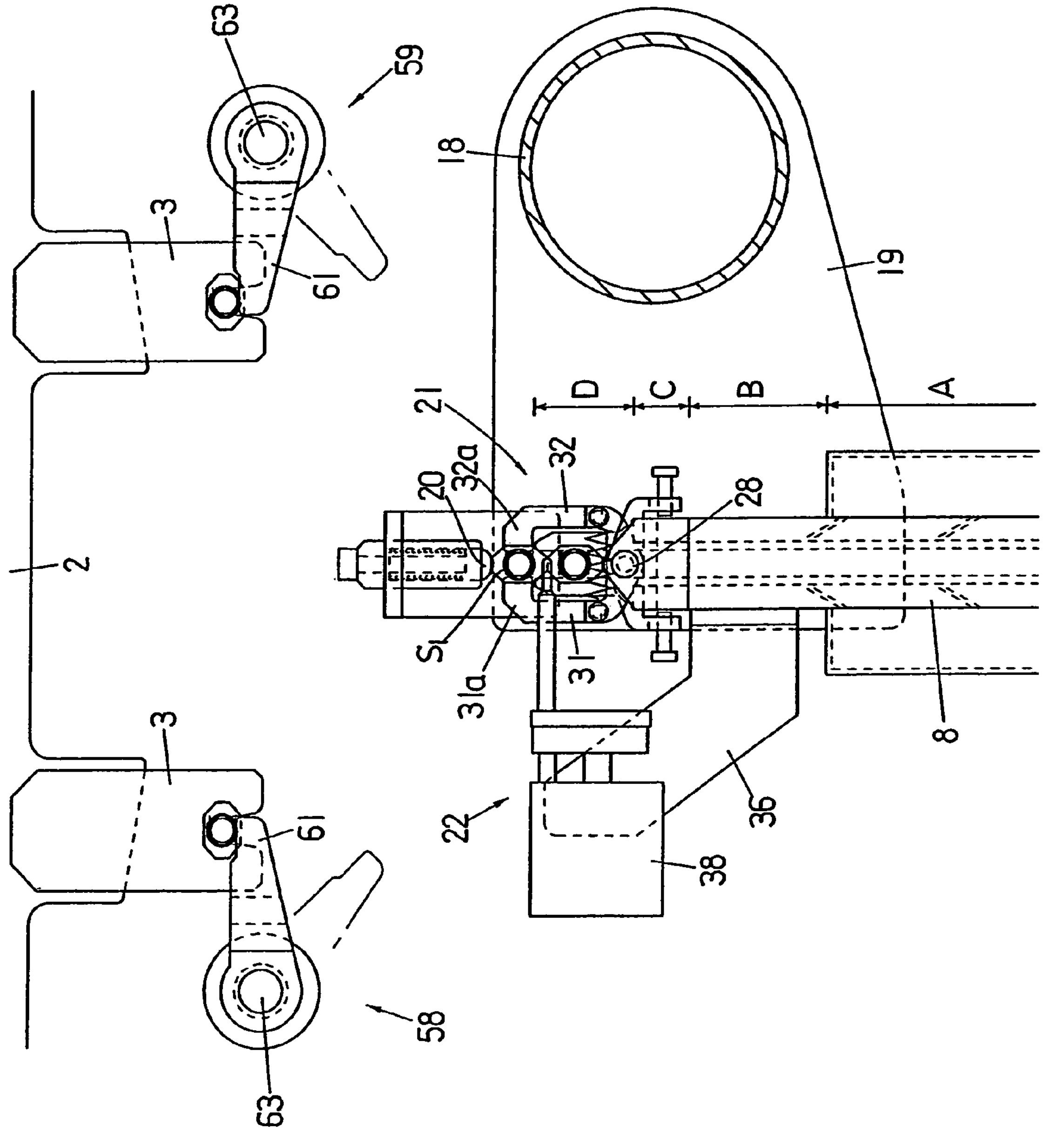
FIG. 4 is a top view of the spout supply apparatus of the present invention with the spout transfer device omitted, thus particularly showing the spout conveying and positioning device.

The spout supply rails 8 are, as best seen from FIG. 3, inclined downward to points located in the vicinity of the front ends of the rails; and they are as shown in FIG. 4 divided into regions A through D in the direction of length of the rails 8. In the region A, sterile pressurized air passages 9 are, as seen from FIGS. 2 and 5, formed on both sides of the rails 8; in the region B, no sterile pressurized air passages 9 are formed; and in the region C, as seen from FIG. 3, the top coverings 8*a* of the rails 8 are not formed, and this area is covered by a clamping arm attachment member 21 (described later). In the region D, which is the front-end region as best seen from FIG. 2, only supporting portions 14 and 15 (extended portions of the supporting portions 12 and 13) that fit into the groove c of the spout S are provided.

Figure 6:
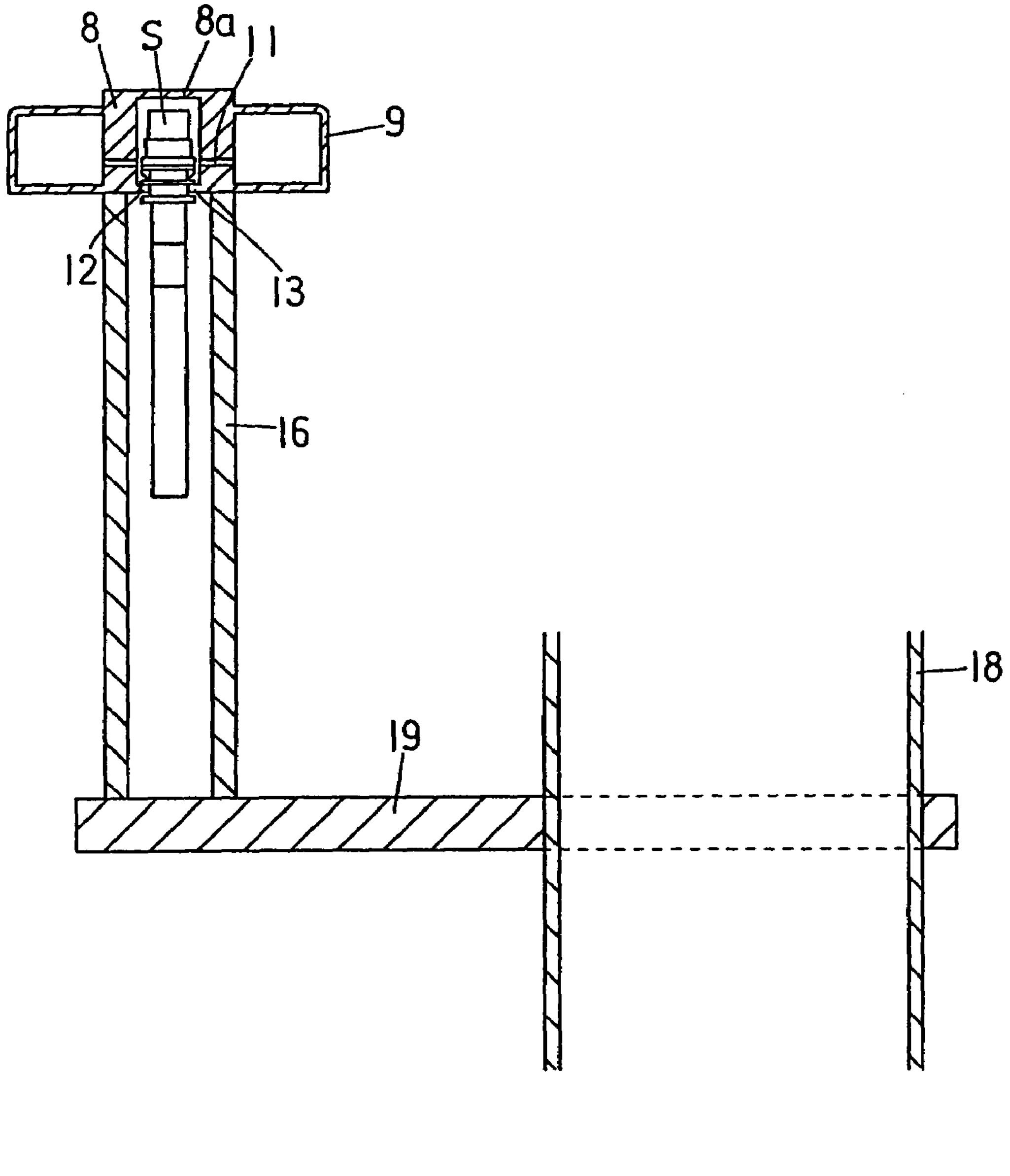
FIG. 6 is a front view, in cross section, of the spout supply rail section of the spout conveying and positioning device of the present invention.
Figure 7:
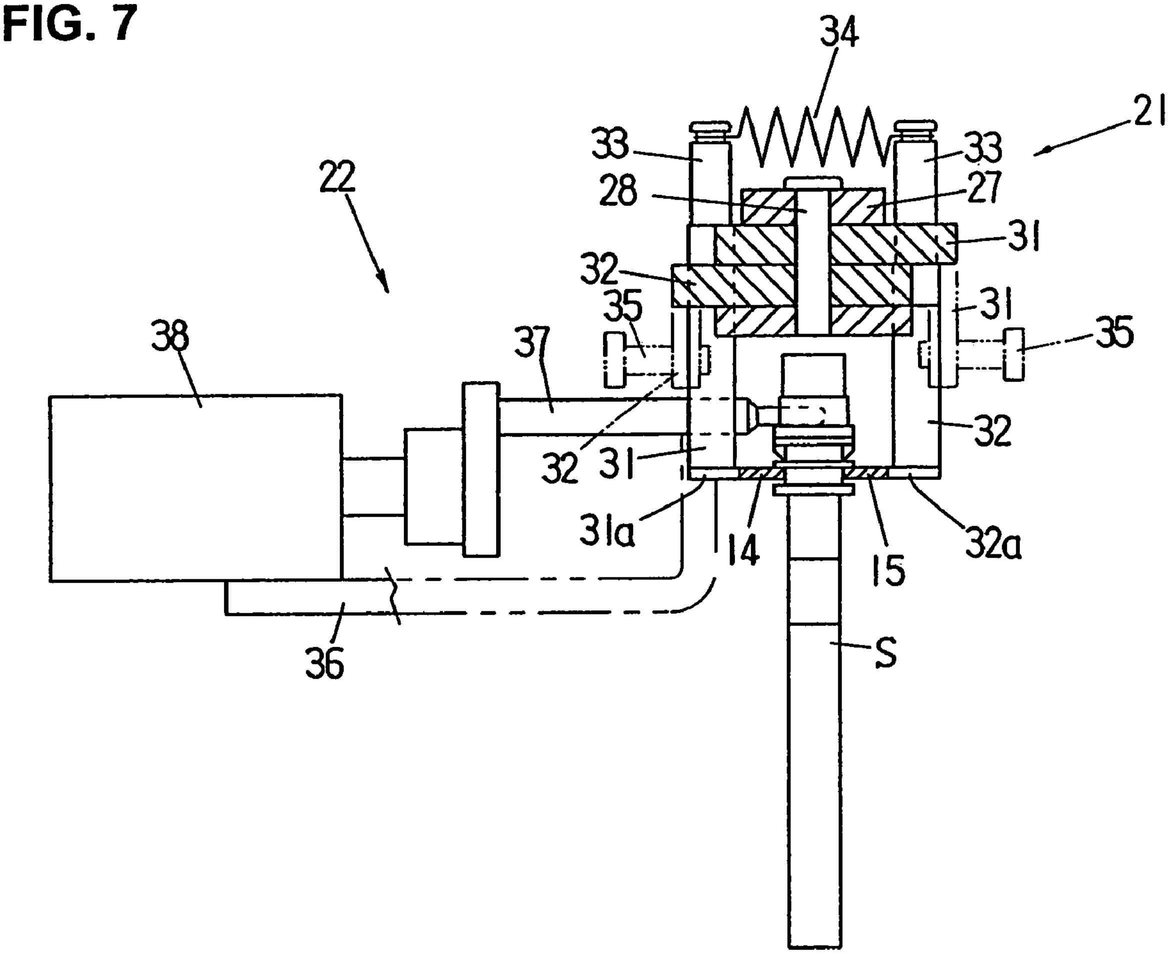
FIG. 7 is a front view, in cross section, of the clamping arms of the spout conveying and positioning device of the present invention.

As seen from FIGS. 3 and 6, the spout supply rails 8 are provided on supporting members 16. The supporting members 16 are fastened to an intermediate flange 19 which is fastened to a hollow stand 18 installed upright on the upper surface of the machine base 17 of the spout sealing machine 1.

The spout conveying and positioning device 6 further includes a positioning stopper 20, a clamping device 21 and a separating device 22 that collectively form a spout positioning means. The spout positioning means positions the leading or first spout S1 (among the spouts S that are conveyed along the spout supply rails 8 in a state in which these spouts are arranged in a single row) in a specified position.

Figure 5:
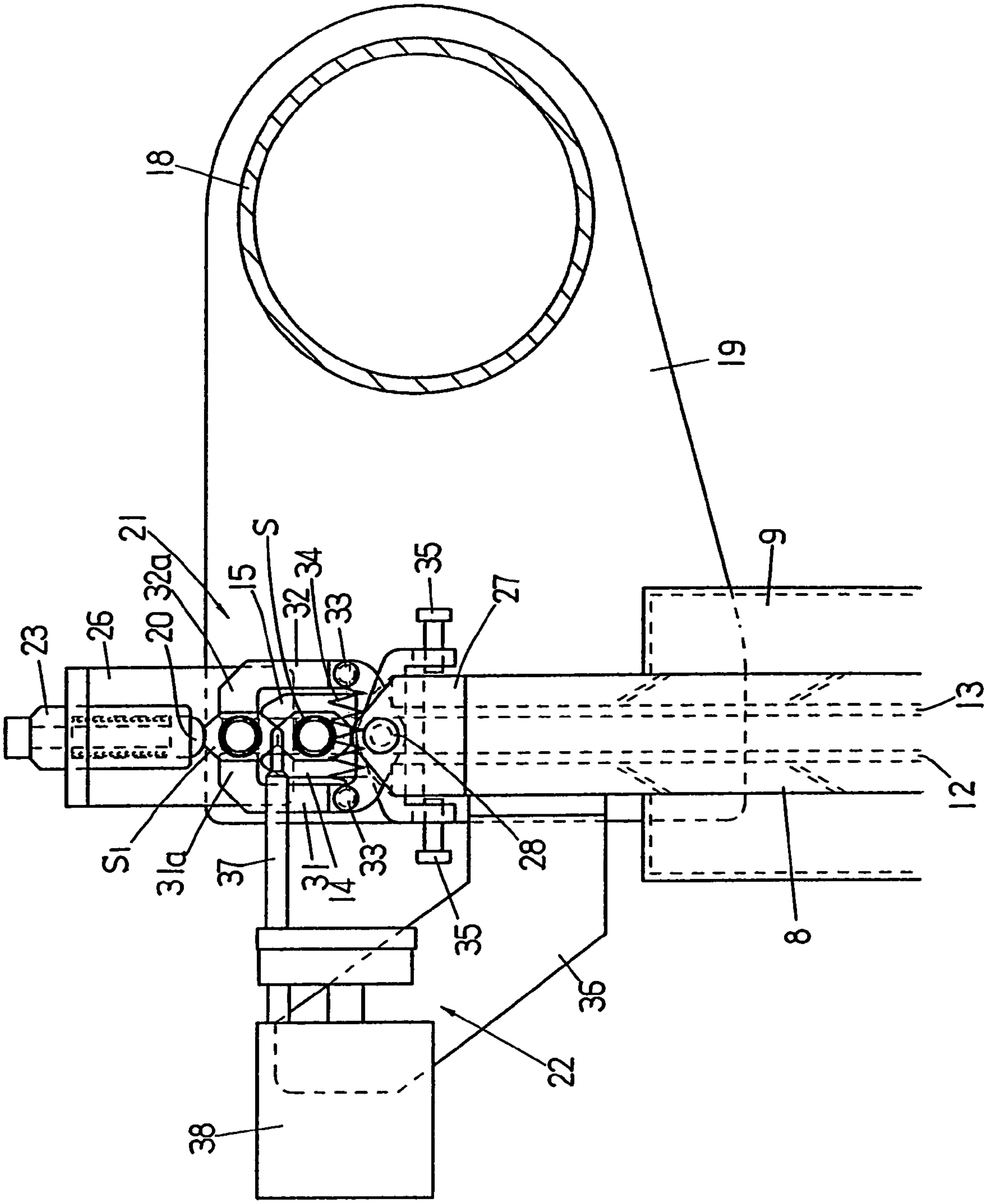
FIG. 5 is an enlarged top view of the essential portion of the spout conveying and positioning device of FIG. 4.

As seen from FIGS. 3 through 5, the positioning stopper 20 of the spout conveying and positioning device 6 faces rearward with respect to the front end of the row of spouts, so that the front end of the flange b of the leading spout S1 comes into contact with this stopper 20. The positioning stopper 20 is free to advance and retract inside a hollow supporting member 23 as seen from FIG. 3 and is urged rearward (or urged toward the leading spout S1) by a compression spring 24, and the rear end position of the positioning stopper 20 is fixed by a checking element 25. The supporting member 23 is attached to the upper end of an attachment member 26 that is fastened to the upper surface of the intermediate flange 19.

As shown in FIGS. 3 through 5 and FIG. 7, the clamping device 21 of the spout conveying and positioning device 6 comprises an attachment member 27 that is fastened to the upper surface of the spout supply rails 8 in the above-described region C of the spout supply rails 8, a supporting pin 28 that is perpendicularly fastened to the attachment member 27, a pair of clamping arms 31 and 32 that are attached to the supporting pin 28 so that the rear end portions of these clamping arms 31 and 32 are pivotable, spring hooks 33 that are fastened to the respective clamping arms 31 and 32, a tension spring 34 which is attached at its both ends to the spring hooks 33, and stoppers 35 that are attached to the rear ends of the respective clamping arms 31 and 32.

The clamping arms 31 and 32 extend forward along both sides of the row of spouts, and the tip end clamping portions 31*a* and 32*a* of these clamping arms face inward (see FIG. 5) in a direction that is substantially perpendicular to the row of spouts. The tip end clamping portions 31*a* and 32*a* are, as seen from FIG. 7, positioned at the same height as the supporting portions 14 and 15 of the spout supply rails 8; the tip end clamping portions 31*a* and 32*a* and the supporting portions 14 and 15 have the same thickness; and in addition, the tip end clamping portions 31*a* and 32*a* are, as seen from FIG. 5, positioned on the front sides of the supporting portions 14 and 15. The clamping arms 31 and 32 are swingable in the horizontal plane about the supporting pin 28 that is disposed on the rear side of the clamping arms 31 and 32 and are driven inward by the tension spring 34. Accordingly, the clamping arms 31 and 32 hold or simply support the leading spout S1, which arrives in the above-described specified position, from both sides. The stoppers 35 maintain the distance between the tip end clamping portions 31*a* and 32*a* at substantially the same distance as the distance between the supporting portions 14 and 15.

As seen from FIGS. 4 and 5, the separating device 22 of the spout conveying and positioning device 6 comprises a separating stopper 37 and an air cylinder 38. The separating stopper 37 is provided on an attachment member 36 that is fastened to the side surface of one of the spout supply rails 8. The separating stopper 37 fits into the space between the leading spout S1 and the next spout S2 (see FIG. 9 for these spouts) so that the spout S2 is prevented from jumping out in the forward direction. The air cylinder 38 causes the separating stopper 37 to move advance and retract in the direction perpendicular to the row of spouts.

Here, the operation of the spout conveying and positioning device 6 will be briefly described.

The grooves c of the spouts S are fitted over the supporting portions 12 and 13 of the spout supply rails 8 (the undersurface of the flange a is supported on the supporting portions 12 and 13), and such spouts S are conveyed forward along the spout supply rails 8 (with the spouts being lined up in a single row) by the propulsion force that is applied from the rear, by the inclination of the spout supply rails 8 and by the driving force of the pressurized air from the blow-out holes 11. The leading spout S1 advances further forward from the supporting portions 14 and 15 and enters the space between the tip end clamping portions 31*a* and 32*a* of the clamping arms 31 and 32 (i.e., the tip end clamping portions 31*a* and 32*a* enter the groove c of the leading spout S1); and this leading spout S1 further contacts the positioning stopper 20 and stops. When the gap between the tip end clamping portions 31*a* and 32*a* is small, the spouts S would push this gap open and enter the space between the tip end clamping portions 31*a* and 32*a*.

The spout transfer device 7 of the spout supply apparatus 4, as shown in FIGS. 2, 3 and 8 through 11, comprises a reciprocating swing arm 41 that makes a reciprocating swing motion in the horizontal plane through a swing angle of 90 degrees, a driving mechanism 42 that causes the reciprocating swing arm 41 to make the reciprocating swing motion, and a pair of holding devices 43 and 44 that are provided on the reciprocating swing arm 41.

Figure 8:
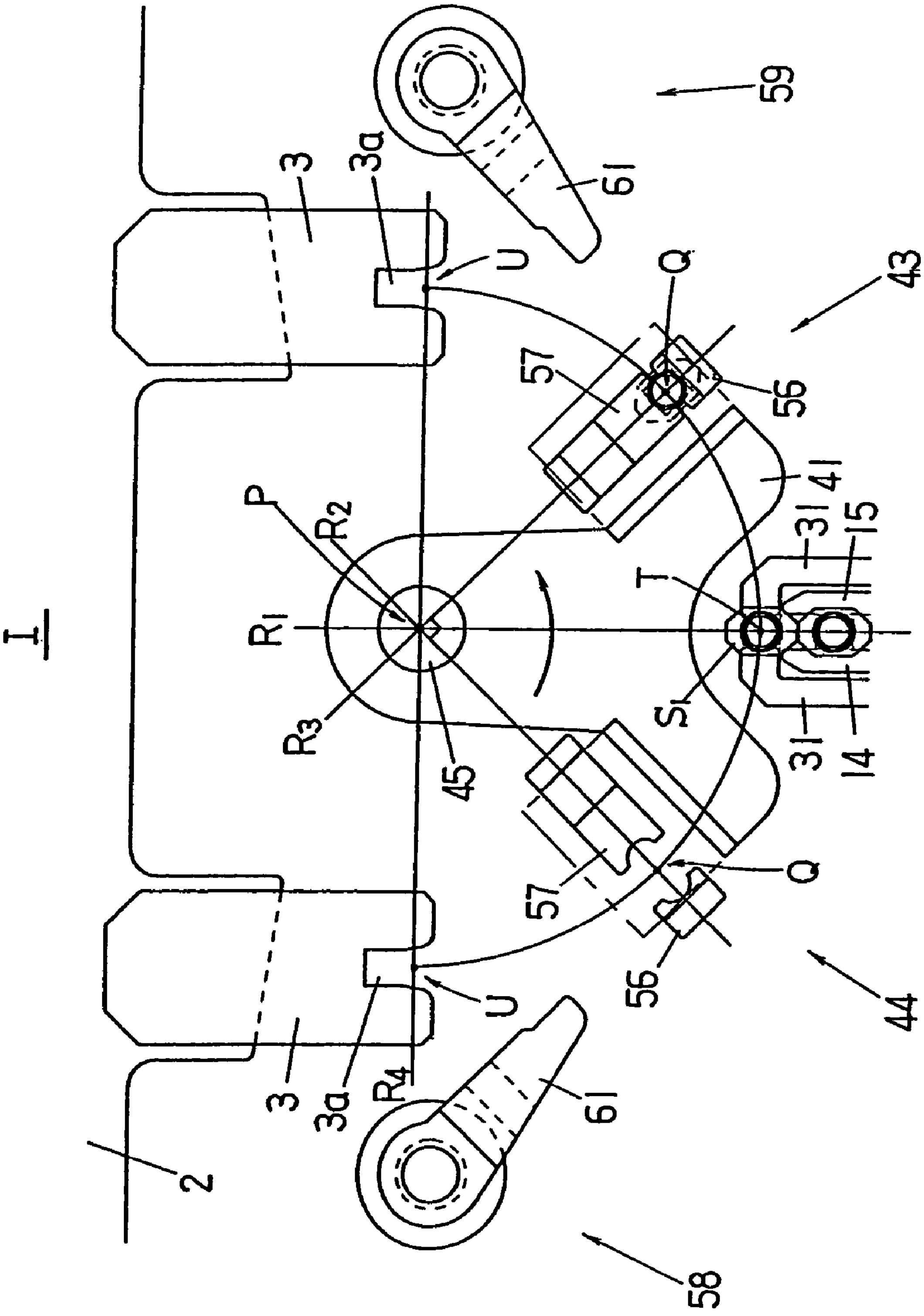
FIGS. 8 through 11 illustrate ordered sequences of the operation of the spout supply apparatus of the present invention.

The reciprocating swing arm 41 is, as seen from FIG. 8, fastened to a supporting shaft 45 of which center is set on a line R1 that extends from of the row of spouts. A supporting plate 46 is, as shown in FIG. 3, fastened to the upper end of a stand 18, a bearing holder 47 is fastened to this supporting plate 46, and the supporting shaft 45 is rotatably provided inside this bearing holder 47.

The driving mechanism 42 is, as seen from FIGS. 2 and 3, comprised of a drive shaft 48 that is supported inside the stand 18 and is linked to a driving source (not shown in the drawings) so that the drive shaft 42 makes a reciprocating rotation within a specified angular range, a swing lever 49 that is fastened to the drive shaft 48, a swing lever 51 that is fastened to the supporting shaft 45, and a rod 52 that connects the swing levers 49 and 51.

When the drive shaft 48 makes a reciprocating (or back-and-forth) rotating motion, the supporting shaft 45 make its reciprocating rotating motion via the swing lever 49, the rod 52 and the swing lever 51; and as a result, the reciprocating swing arm 41 attached to the supporting shaft 45 makes a reciprocating swing motion in the horizontal plane through a swing angle of 90 degrees (see FIG. 8).

Each of the holding devices 43 and 44 of the spout transfer device 7 comprises, as seen from FIG. 3, a chuck type air cylinder 53 that is fastened to the reciprocating swing arm 41, a pair of claws 54 and 55 that are opened and closed by this air cylinder 53, and spout holding members 56 and 57 that are fastened to the respective claws 54 and 55. The spout holding members 56 and 57 open and close at a specified timing and hold the head h of the spout S when closed.

The spout holding members 56 and 57 of the respective holding devices 43 and 44 make a reciprocating swing motion in the horizontal plane through a swing angle of 90 degrees about the center P of the supporting shaft 45 (see FIG. 8) when the reciprocating swing arm 41 on which the respective holding devices 43 and 44 are provided makes its reciprocating swing motion as described above.

As seen from FIG. 8, the holding centers Q (which correspond to the center positions of the spout S when the spout holding members 56 and 57 close and hold the head h of the spout S) of the spout holding members 56 and 57 are set to be disposed at equal distances from the swing center P. The angle formed by two straight lines R2 and R3 that connect the swing center P and the respective holding centers Q of the spout holding members 56 and 57 is set at 90 degrees. The moving range of the holding centers Q caused by the swing motion of the spout holding members 56 and 57 is set between the point T that is on the straight line R1 and the points U that are on a straight line R4 which passes through the swing center P and is perpendicular to the straight line R1.

Furthermore, the position of the point T is set so as to coincide with the center position of the leading spout S1 when this spout S1 comes into contact with the positioning stopper 20 and is positioned thereby. Moreover, the position of each one of the points U is set so that this position is at substantially the center of the clamping groove 3*a* of each one of the two clamping members 3 that are at the stopping position I (see FIG. 1) when the table 2 stops. The clamping grooves 3*a* of the clamping members 3 open to face the rearward of the row of spouts. Furthermore, it is set timing-wise so that the respective spout holding members 56 and 57 close when the holding centers Q thereof arrive at the point T and these spout holding members open when the holding centers Q arrive at the points U. Thus, the point T is the spout receiving position for the spout holding members 56 and 57, and the points U are the spout transfer positions for the spout holding members 56 and 57; and in addition, the spout transfer positions U are disposed on either side of the swing center P.

In this spout transfer device 7, when the reciprocating swing arm 41 arrives at one end of its reciprocating swing motion, the spout holding members 56 and 57 (or the first set of spout holding members 56 and 57) of, for instance, the holding device 43 hold the spout S1 in the spout receiving position, and the spout holding members 56 and 57 (or the second set of spout holding members 56 and 57) of the holding device 44 transfer a spout in one spout transfer position to the spout clamping member 3 that is waiting in this spout transfer position. When the reciprocating swing arm 41 arrives at another end of its reciprocating swing motion, the (first) spout holding members 56 and 57 of the holding device 43 transfer the spout S1 in another spout transfer position to the spout clamping member 3 that is waiting in this spout transfer position, and the (second) spout holding members 56 and 57 of the holding device 44 hold a spout in the spout receiving position.

Since the spout holding members 56 and 57 swing 90 degrees from the spout receiving position to the spout transfer position, the orientation of the spout held by the spout holding members is altered by 90 degrees with respect to its orientation when the spout S was in the line of the row of spouts, and the spout in this 90 degree turned posture is then transferred to the spout clamping members 3.

Figure 12:
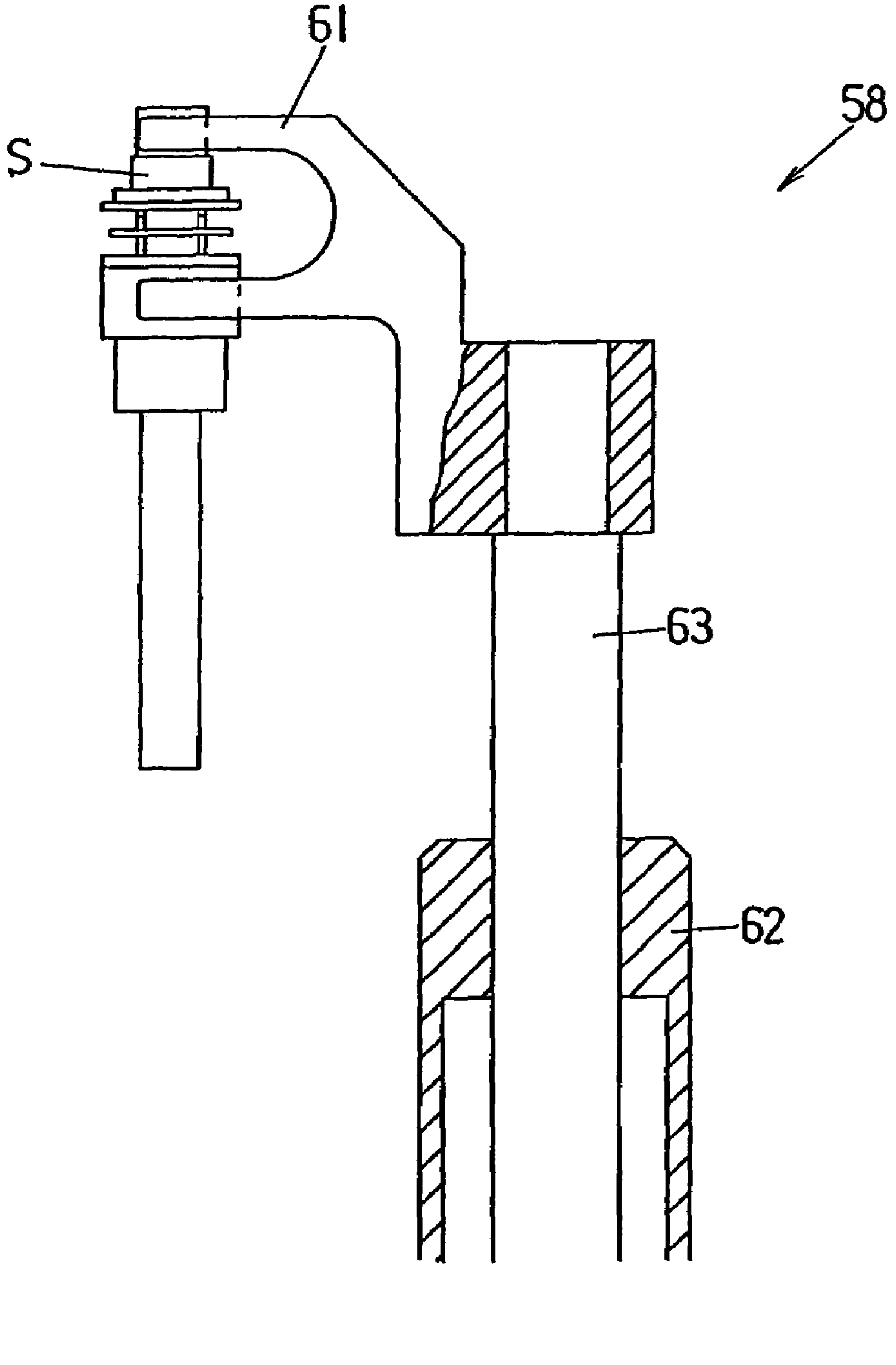
FIG. 12 is a front view, in cross section, of the push-in device of the present invention.

As seen from FIGS. 4 and 12, the spout supply apparatus 4 further includes a pair of spout push-in devices 58 and 59.

Each of the spout push-in devices 58 and 59 is comprised of a push-in member 61, which swing in the horizontal plane near the corresponding spout transfer position (or near the corresponding spout clamping member 3), and a drive shaft 63, which is provided so as to rotate on a supporting stand 62 disposed upright on the upper surface of the machine base 17. The drive shaft 63 is linked to a driving source (not shown in the drawings) and makes a reciprocating back-and-forth rotation through a specified angle. The push-in member 61 is fastened to the upper end of the drive shaft 63. The push-in member 61 swings at a specified timing when the drive shaft 63 rotates for a specified angle and pushes the spout S that is held in the vicinity of the entrance of the clamping groove 3*a* of each one of the spout clamping members 3 into the interior or back of the clamping groove 3*a* in the above-described spout transfer position, so that the spout is securely held in the clamping grooves 3*a*.

The operation of the spout conveying and positioning device 6 and spout transfer device 7 of the spout supply apparatus 4 will be described below more concretely with reference to FIGS. 8 through 11.

(1) In FIG. 8, the table 2 stops, and two clamping members 3 of the table 2 are positioned at the stopping position I. The reciprocating swing arm 41 of the spout transfer device 7 is at an intermediate point of the rightward swing motion shown by the curved arrow. In the holding device 43 of the spout transfer device 7, the spout holding members 56 and 57 are closed, and a spout is held in this holding device 43; and in the holding device 44 of the spout transfer device 7, the spout holding members 56 and 57 are open. Meanwhile, in the spout conveying and positioning device 6, the leading spout S1 is positioned in the spout receiving position; and at this point, the separating stopper 37 is protruding (see FIG. 4). Both of the push-in members 61 are in a retracted position.

Figure 9:
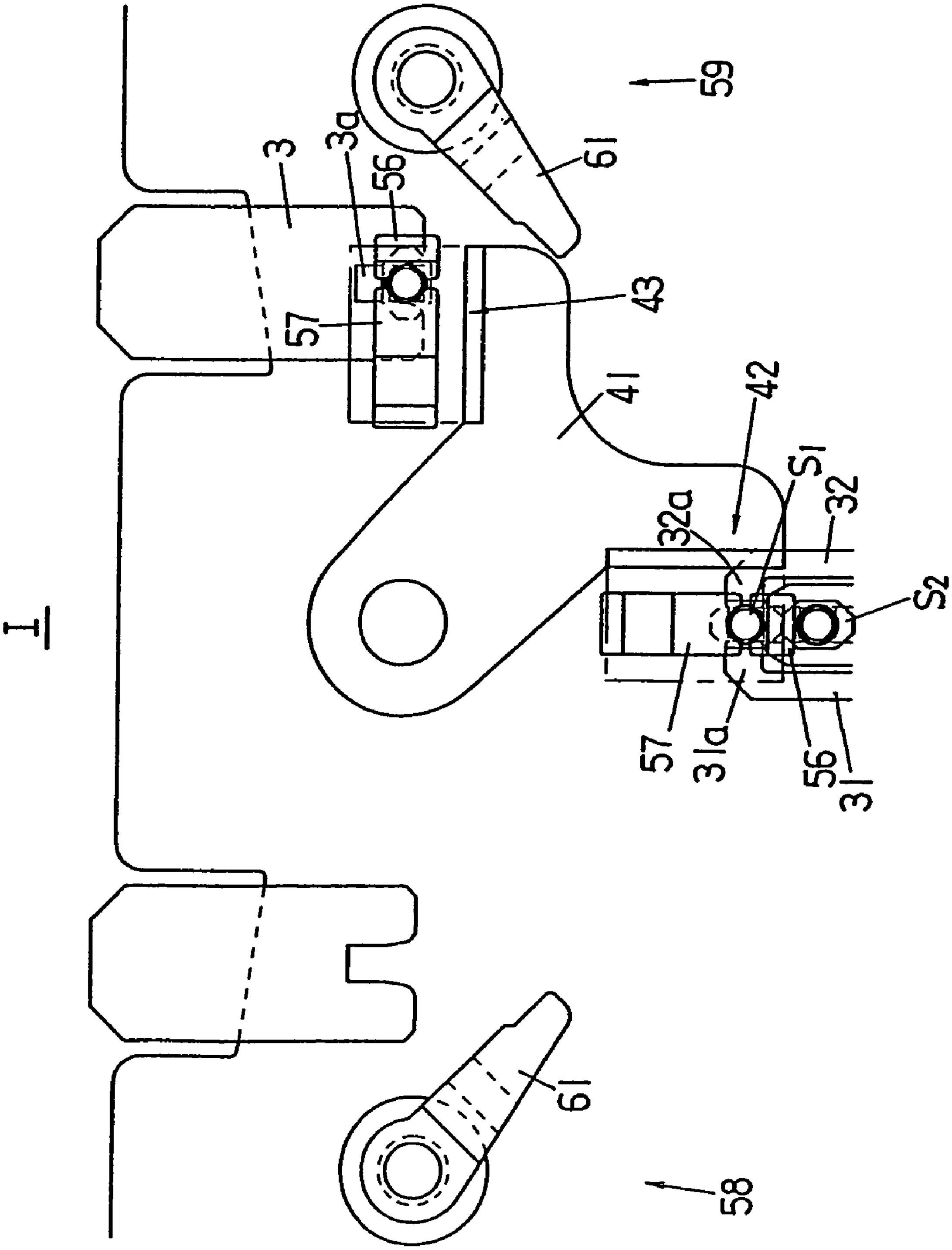

(2) In FIG. 9, which shows the next sequence to the one shown in FIG. 8, the reciprocating swing arm 41 has arrived at the end of its rightward swing motion. In the holding device 43, its spout holding members 56 and 57 have arrived at the spout transfer position, and the spout held therein is pushed into the clamping groove 3*a* of the right-side clamping member 3, so that the spout is transferred and held in the clamping groove 3*a*. Next, the spout holding members 56 and 57 of the holding device 43 open and release the spout. In the holding device 44, on the other hand, the spout holding members 56 and 57 have arrived at the spout receiving position and closed, thus holding the spout S1 positioned in the spout receiving position.

At this point, the spout S1 is between the tip end clamping portions 31*a* and 32*a* of the clamping arms 31 and 32. Subsequently, however, when the reciprocating swing arm 41 begins to swing leftward so that the spout S1 held by the spout holding members 56 and 57 of the holding device 44 begins to move leftward along the circular arc form path from the spout receiving position, the tip end clamping portion 31*a* is pressed by the spout S1 so that the clamping arm 31 swings proportionally against the driving force of the tension spring 34. When the spout S1 held by the spout holding members 56 and 57 is moved leftward in FIG. 9 to some extent so that this spout is separated from the tip end clamping portion 31*a,* then the clamping arm 31 returns to its original position by the action of the tension spring 34.

Then, the separating stopper 37 retracts, and the next spout S2 is pushed out in the forward direction and positioned in the spout receiving position. Subsequently, the separating stopper 37 immediately protrudes.

Figure 10:
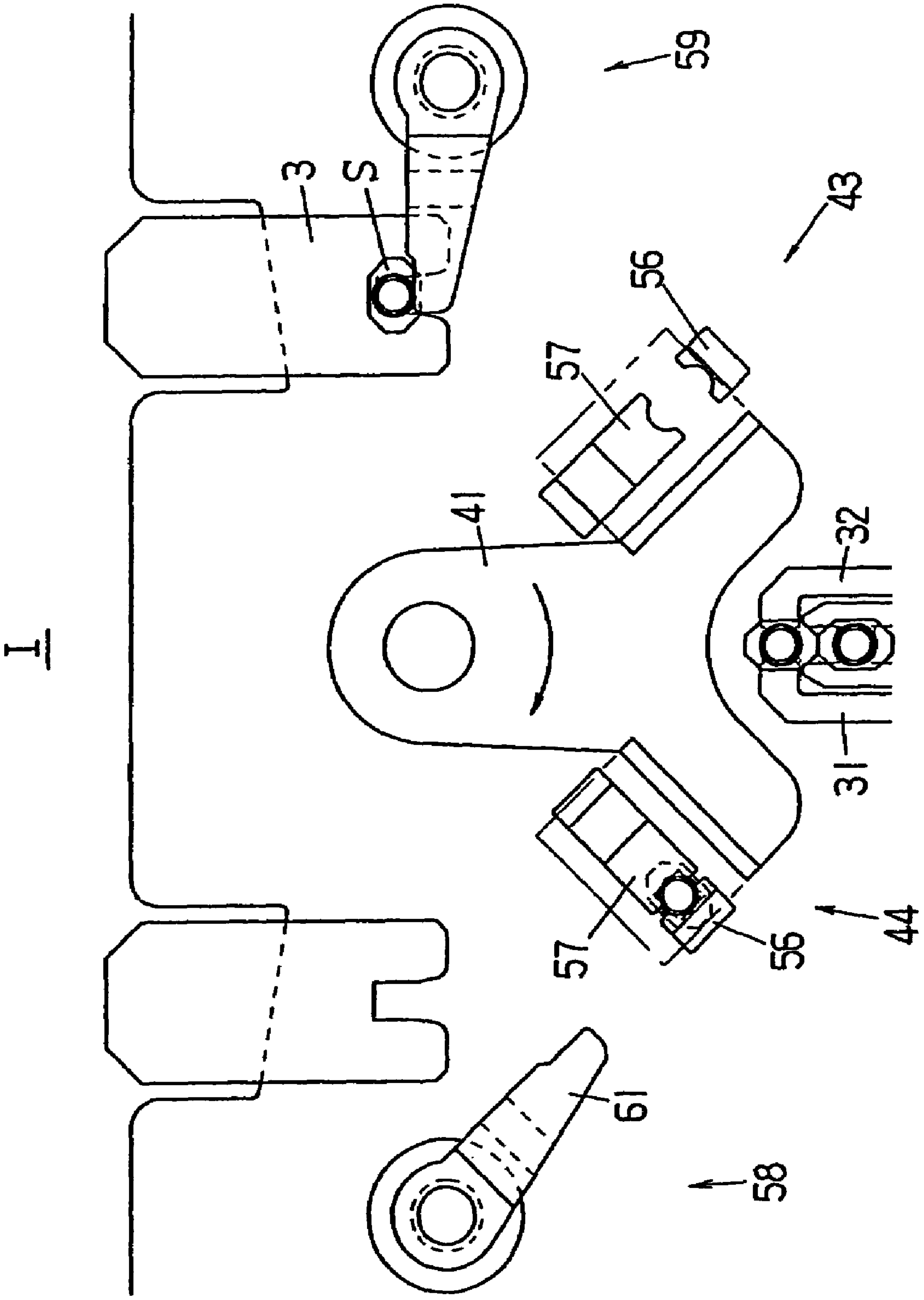

(3) In the next sequence, as shown in FIG. 10, the reciprocating swing arm 41 is at an intermediate point of the leftward swing action. In the holding device 43, the spout holding members 56 and 57 are open; while in the holding device 44, the spout holding members 56 and 57 are closed and keep holding the spout S1. The right-side push-in member 61 of the push-in device 59 swing forward and pushes the spout, which is in the right-side spout transfer position, into the interior or into the back of the clamping groove 3*a* of the right-side clamping member 3.

Figure 11:
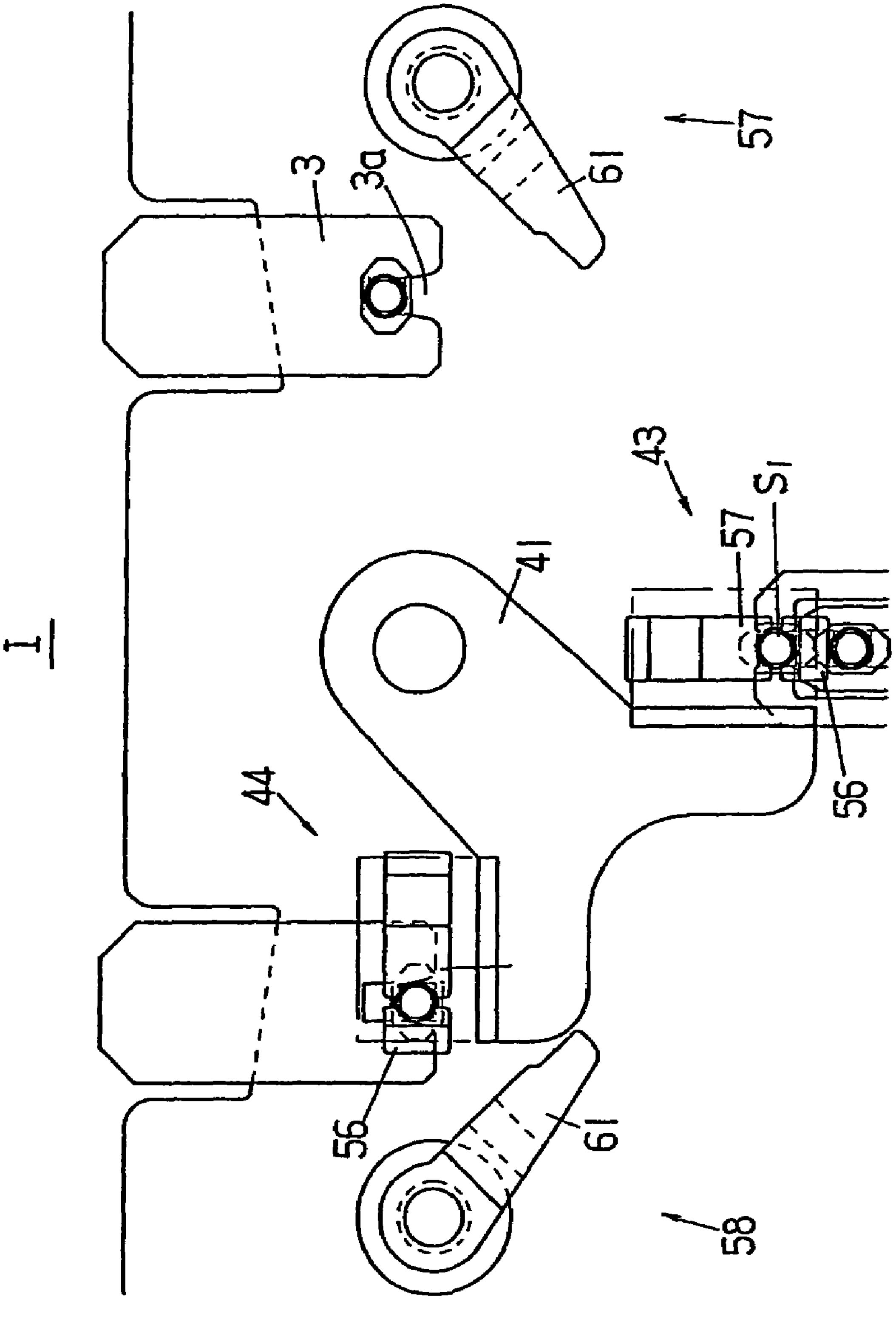

(4) In the following sequence that is shown in FIG. 11, the reciprocating swing arm 41 has arrived at the end of the leftward swing motion. In the holding device 43, the spout holding members 56 and 57 that were opened have arrived at the spout receiving position and closed, so that the spout S1 positioned in this spout receiving position is held by the spout holding members 56 and 57 of the holding device 43. In the holding device 44, the spout holding members 56 and 57 thereof have arrived in the spout transfer position, and the spout held by the spout holding members 56 and 57 of the holding device 44 has been pushed inward in the vicinity of the entrance of the clamping groove 3*a* of the left-side clamping member 3 and is held in this clamping groove 3*a*. Then, the spout holding members 56 and 57 open and release the spout.

Subsequently, the reciprocating swing arm 41 begins to swing back to the right, so that the spout S1 held by the spout holding members 56 and 57 of the holding device 43 is moved rightward along the circular arc form path from the spout receiving position, and the holding members 56 and 57 of the holding device 44 also simultaneously move rightward (see FIG. 8). Then, the left-side push-in member 61 of the push-in device 58 swings forward and pushes the spout S that is in the spout transfer position into the interior or into the back of the clamping groove 3*a* of the left-side clamping member 3.

(5) Next, the table 2 rotates, the next pair of clamping members 3 of the table 2 stop in the stopping position I, and the above operation is repeated.

In the above-described embodiment, the opening direction of the clamping grooves 3*a* is the same for the same set of two spout clamping members 3; as a result, the swing angle of the reciprocating swing arm 41 and the angle formed by the straight lines R2 and R3 that connect the swing center P and the two holding centers Q of the holding members 56 and 57 are set at 90 degrees, and thus the two sets of spout holding members 56 and 57 are provided at an angle of approximately 90 degrees apart from each other. However, as long as the clamping grooves 3*a* of the two spout clamping members 3 of the same set all face in the radial direction of the table 2, the above-described angle can be set at an angle that is slightly larger than 90 degrees.

In addition, the embodiment above is described with reference a supply apparatus for a spout; however, as described above, the present invention is indeed applicable to an apparatus that supplies a bag to which a spout is attached to various sealing, filling machines, etc.

The invention caimed is:

1. A spout supply apparatus comprising:

a spout conveying and positioning device which conveys spouts lined up in a single row and successively positions a spout in a spout receiving position, and a spout transfer device which successively receives said spout that is in said spout receiving position, conveys said spout toward spout transfer positions while changing orientation of said spout by approximately 90 degrees, and transfers said spout to spout clamping members that are disposed at said spout transfer positions; wherein:

said spout transfer device comprises two sets of spout holding members that have a common swing venter and swing in a reciprocating swing motion in a horizontal plane through a swing angle of approximately 90 degrees, said two sets of spout holding members have respective holding centers which are set to be equidistant from said swing center, said two sets of spout holding members are provided at an angle of approximately 90 degrees apart from each other, each one of said spout transfer positions is disposed on each side of said swing center, said spout receiving position and spout transfer positions are located at either end of a circular are that is drawn, when said two sets of spout holding members swing, by each one of said holding centers;

said two sets of spout holding members are comprised of first set of spout holding members and second set of spout holding members; and when said two sets of spout holding members are at one end of said swing motion, said first set of spout holding members holds a spout in said spout receiving position, while said second set of spout holding members transfers a spout to one of said spout clamping members that is disposed at one of said spout transfer positions, and when said two sets of spout holding members are at another end of said swing motion, said second set of spout holding members holds a spout in said spout receiving position, while said first set of spout holding members transfers a spout to another one of said spout clamping members that is disposed at another one of said spout transfer positions.

2. The spout supply apparatus according to claim 1, wherein said two sets of spout holding members respectively open and close and hold a spout when closed, said two sets of spout holding members are provided on a swing arm that makes a reciprocating swing motion through a swing angle of approximately 90 degrees, and a swing center of said swing arm coincides with said swing center of said two sets of spout holding members.

3. The spout supply apparatus according to claim 1, wherein said spout conveying and positioning device comprises a pair of clamping arms which are free to swing in a horizontal plane and are resiliently driven inward in a direction that is substantially perpendicular to said row of spouts, and said clamping arms hold said spout in said spout receiving position with tip end clamping portions of said clamping arms.

4. A spout supply apparatus comprising:

a spout conveying and positioning device which conveys spouts lined up in a single row and successively positions a spout in a spout receiving position, and a spout transfer device which successively receives said spout that is in said spout receiving position, conveys said spout toward spout transfer positions while changing orientation of said spout by approximately 90 degrees, and transfers said spout to spout clamping members that are disposed at said spout transfer positions; wherein:

said spout transfer device comprises two sets of spout holding members that have a common swing center and swing in a reciprocating swing motion in a horizontal plane through a swing angle of approximately 90 degrees, said two sets of spout holding members have respective holding centers which are set to be equidistant from said swing center, said two sets of spout holding members are provided at an angle of approximately 90 degrees apart from each other, each one of said spout transfer positions is disposed on each side of said swing center, said spout receiving position and spout transfer positions are located at either end of a circular are that is drawn, when said two sets of spout holding members swing, by each one of said holding centers;

each one of said spout clamping members is provided with a clamping groove for holding a spout therein, and said spout supply apparatus is further provided in the vicinity of said spout transfer positions with push-in members that swing in a horizontal plane, said push-in members respectively pushing a spout, which is at the vicinity of entrance of said clamping groove, to inside of said spout clamping members.

* * * * *